United States Patent
Wenger et al.

[11] Patent Number: 5,499,201
[45] Date of Patent: Mar. 12, 1996

[54] METHOD FOR REDUCING THE ELECTRICITY CONSUMPTION OF MICROPROCESSOR-BASED APPARATUSES, IN PARTICULAR THOSE FOR PUBLIC TELEPHONE STATIONS

[76] Inventors: Joel Wenger, Ch. de la Montagne 124, Chêne-Bougeries, Switzerland, 1224; Philippe Broccard, Jules-Crosnier 16, Geneva, Switzerland, 1206

[21] Appl. No.: 146,009
[22] PCT Filed: Mar. 10, 1993
[86] PCT No.: PCT/CH93/00064
§ 371 Date: Nov. 12, 1993
§ 102(e) Date: Nov. 12, 1993
[87] PCT Pub. No.: WO93/18608
PCT Pub. Date: Sep. 16, 1993

[30] Foreign Application Priority Data

Mar. 12, 1992 [CH] Switzerland .................. 805/92

[51] Int. Cl.⁶ ..................................... H02J 3/16
[52] U.S. Cl. ................ 364/707; 455/303; 395/750
[58] Field of Search .................. 364/492, 707, 364/464.02, DIG. 1; 455/83.3, 343; 370/100.1; 395/750; 307/31

[56] References Cited

U.S. PATENT DOCUMENTS

| | | | |
|---|---|---|---|
| 4,097,923 | 6/1978 | Eckert, Jr. et al. | 364/464.02 |
| 4,964,121 | 10/1990 | Moore | 370/100.1 |
| 5,021,679 | 6/1991 | Fairbanks et al. | 364/707 |
| 5,041,964 | 8/1991 | Cole et al. | 364/707 |
| 5,142,684 | 8/1992 | Perry et al. | 364/707 |
| 5,148,380 | 9/1992 | Lin et al. | 364/707 |
| 5,189,647 | 2/1993 | Suzuki et al. | 364/707 |
| 5,204,986 | 4/1993 | Ito et al. | 455/343 |
| 5,220,672 | 6/1993 | Nakao et al. | 364/707 |
| 5,222,239 | 6/1993 | Rosch | 364/707 |
| 5,230,056 | 7/1993 | Hoshina | 364/707 |
| 5,274,843 | 12/1993 | Murai et al. | 455/83.3 |
| 5,291,542 | 3/1994 | Kivari et al. | 364/707 |
| 5,298,795 | 3/1994 | Suzuki et al. | 364/707 |
| 5,369,771 | 11/1994 | Gettel | 364/DIG. 1 |

*Primary Examiner*—Ellis B. Ramirez
*Assistant Examiner*—Thomas Peeso
*Attorney, Agent, or Firm*—Oblon, Spivak, McClelland, Maier & Neustadt

[57] ABSTRACT

The electricity consumption of a telephone kiosk is reduced when quiescent by a clock handler which varies the frequency of the pulses sent to the microprocessor for operating it.

12 Claims, 2 Drawing Sheets

METHOD FOR REDUCING THE ELECTRICITY CONSUMPTION OF MICROPROCESSOR-BASED APPARATUSES, IN PARTICULAR THOSE FOR PUBLIC TELEPHONE STATIONS

BACKGROUND OF THE INVENTION

1. Field of the Invention

The present invention relates to the field of electrical apparatuses comprising microprocessors, and in particular a method and a device reducing their average electrical energy consumption.

2. Discussion of the Background

For certain electrical apparatuses, the need to limit the electrical energy consumption to a minimal value is very great. This is particularly true for public telephone stations. Indeed, the latter are generally supplied via the telephone line and the permitted electrical energy which may be tapped off for operation is very limited.

The problem becomes trickier as public telephone stations are developed further and further.

The document EP 0 275 566 describes a method for reducing the electricity consumption of a public telephone station, in which the control installation comprises a microprocessor. In this method, the frequency of the base cycle of the system, controlled externally, is cut by the microprocessor by means of a cutting signal generated internally at a given instant, and reset later by means of a reset signal generated externally, the reset signal being derived from a control clock whose frequency is low by comparison with the frequency of the base cycle of the system. This method has the following disadvantages:

the system operates at one frequency only, that of the system clock. The control clock merely engages or triggers the clock of the system. During the time which separates such a triggering from the following engagement, the microprocessor is paralysed and is unable to recognize interrupts or external conditions which would normally cause it to react;

the microprocessor cannot handle the time, since the system clock is interrupted intermittently;

it is readily seen that the realizable energy saving cannot exceed 50% in the best of cases.

The document EP-0 391 543 describes a microprocessor clock for a public telephone station, in which a microprocessor peripheral sends an interrupt simultaneously with the speeding up of the clock signal when a data packet is received from the telephone exchange. The interrupt is processed with the aid of the speeded-up clock signal to reduce the response time of the system, which makes it possible to reduce the normal clock frequency so as to save energy. This method has the disadvantage of relying excessively on the microprocessor's peripheral.

In this document it is assumed that the microprocessor is the main consumer of energy and its consumption alone is reduced without tackling that of the peripheral, which may be just as large. The overall consumption of the apparatus is therefore not reduced sufficiently.

Processes are known, for example from European Patent No. 0 155 126, in which an oscillator provides clock pulses required for operating the microprocessor, and in which an expected outside event, or interrupt, as for example the insertion of a coin into the appropriate slot of a public telephone apparatus, prompts a subassembly of the apparatus, namely the system for recognizing and evaluating coins, to pass from the monitoring state to the active state.

However, in these methods, the checking of the electricity consumption of the microprocessor remains rudimentary. During the monitoring state, the microprocessor remains supplied at the normal frequency, which induces still relatively high consumption of electrical energy.

SUMMARY OF THE INVENTION

The invention which will be described makes it possible to lower still further and very appreciably the electrical energy consumption of automatic telephone stations equipped with a device for accomplishing this.

The solution proposed here is based on the fact that the microprocessors consume most electrical energy upon the switching of the clock pulses used to operate them. Hence, if during the periods of inactivity of a microprocessor, its clock frequency is lowered, its electrical energy consumption is then reduced automatically.

The main oscillator, at the usual frequencies of 4 MHz, exhibiting a non-negligible consumption (about 1 mA), the invention provides generally for a system of oscillators placed upstream of the clock handler, the assembly being capable of varying the clock frequency reaching the microprocessor.

The principle consists in entrusting the monitoring and the rate of switching between normal frequency and secondary frequency to a clock handler comprising a fixed timebase, of much lower frequency yet than the secondary frequency chosen for the monitoring state of the microprocessor. The frequency of this fixed timebase is dependent on the secondary frequency. If the normal operating frequency of the microprocessor is 4 MHz, the secondary frequency characteristic of the monitoring state is for example 250 kHz, and the frequency of the fixed timebase is for example 50 kHz.

A first line links the handler to the microprocessor and enables the fixed timebase pulses to be sent.

Whenever a pulse, corresponding to the frequency of the fixed timebase, is sent by the clock handler via a second line to the microprocessor, the latter passes to the active state and carries out a number of checks of the state of the peripherals (keyboard, handset pad, etc.). When the microprocessor has finished these checks, it orders the manager, if appropriate, via a third line, to pass back to the inactive state.

The passage to the active state can also be determined by the arrival of an interrupt which is itself the consequence of an outside event: the arrival of a tariff pulse from the exchange, the insertion of a coin into a slot, the supervision of the supply voltages, etc.

The command issued to the handler by the microprocessor depends on the activity of this microprocessor. It may decide to switch or to remain at the normal frequency if the need is felt (for example the timing of a period such as the duration corresponding to a tariff). When the checks have determined the absence of timing, the microprocessor orders the handler to pass to the monitoring state.

In a particular embodiment of the invention, the handler varies the clock frequency discontinuously, between discrete values. This embodiment differs from an embodiment in which all the frequency values lying between a minimum and a maximum may be chosen a priori.

In a particular embodiment of the invention, the frequency can take just two values: the value of the normal frequency of the microprocessor's base cycle, termed the normal frequency, and a lower value, termed the secondary frequency, chosen so as to lower the electricity consumption of the microprocessor when the conditions mean that it can be placed in the inactive state.

In a particular embodiment of the invention, the oscillator system consists of a single oscillator, delivering the normal frequency, and the handler consists of a frequency divider.

In another embodiment of the invention, the oscillator system consists of two oscillators, one, termed the main oscillator, delivering the normal frequency, and the other, termed the secondary oscillator, delivering the secondary frequency. The handler cuts off the supply to the main oscillator when the secondary oscillator, generating the secondary frequency of lower value than the normal frequency, is selected by the handler. The only signals remaining on the second line are those generated by the secondary oscillator.

In a particular embodiment of the invention, the normal frequency is 4 MHz and the secondary frequency is 250 kHz. In the case of a frequency divider, this secondary frequency is no more than the normal frequency divided by 16 by the handler.

BRIEF DESCRIPTION OF THE DRAWINGS

Other advantages of the invention will emerge below from the detailed description of an embodiment of the invention, with reference to the attached drawing, consisting of FIGS. 1 to 4 in which.

DESCRIPTION OF THE PREFERRED EMBODIMENTS

Figure 1:
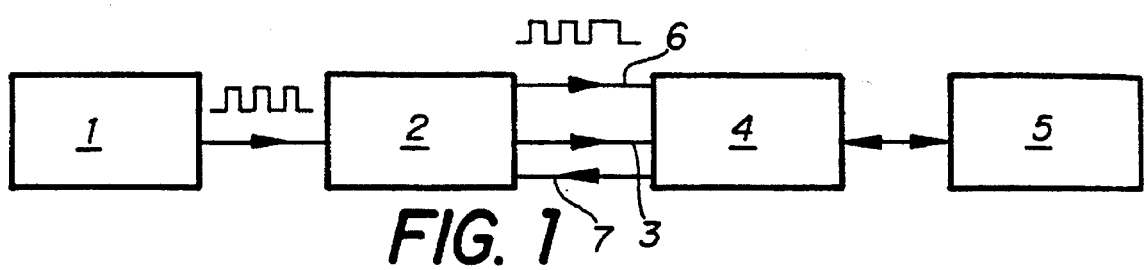
FIG. 1 represents a block diagram showing diagrammatically the operating of the method calling upon a frequency divider.

In FIG. 1,
rectangle 1 represents the oscillator;
rectangle 2 represents the clock handler;
rectangle 4 represents the microprocessor;
rectangle 5 represents the assembly of circuits driven by the microprocessor 4 when it is active.

Figure 3:
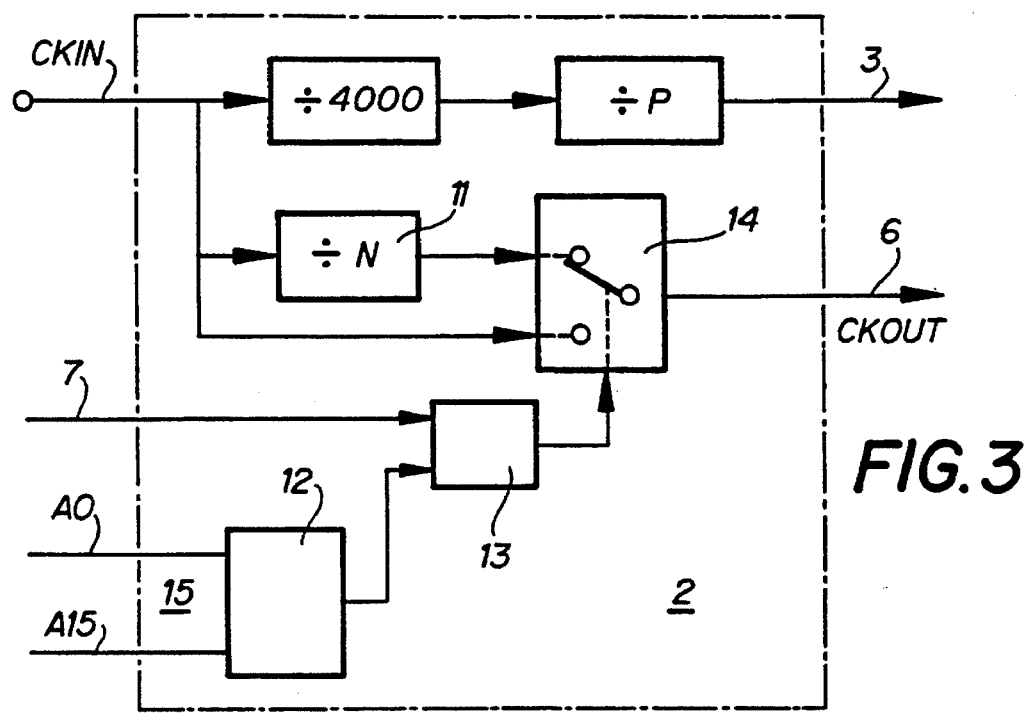
FIG. 3 represents a block diagram of the clock handler 2 of FIG. 1, in the case of a single oscillator with frequency division.

A first line 3 links the fixed timebase, contained in the handler 2, to the microprocessor 4. It carries, from the handler 2 to the microprocessor 4, the signals of the fixed timebase whose frequency is dependent on the secondary frequency via a frequency divider which divides this frequency by the value P (FIG. 3). This frequency of the fixed timebase is chosen to be much lower than the minimum value of a clock frequency, carried on a second line 6 between the handler 2 and the microprocessor 4. This clock frequency is determined both by the handler 2 and by the microprocessor 4, as follows:

the microprocessor 4 carries out a set of checks on each reception of a pulse from the fixed timebase via the first line 3. On completing this set of checks, a command is generated by the microprocessor 4 intended for the handler 2 and is carried by a third line 7, furnished in FIG. 1 with a leftward arrow;

this command is interpreted by the handler 2 which accordingly varies the clock frequency of the clock pulses carried to the microprocessor 4 via the second line 6.

Optimization of the clock frequency by constant interaction between the handler 2 and the microprocessor 4 makes it possible in turn to minimize the energy consumption of the microprocessor 4, and hence of the station.

The circuits 5 driven by the microprocessor 4 when it is in the active state are linked to the latter by an address bus 15, known per se.

The return of the clock pulses to the normal frequency, so that the microprocessor 4 may resume its normal activity, that is to say carry out the handling of programme time, is done:

either by virtue of the timebase whose signals are transmitted via the first line 3 to the microprocessor 4, which thus periodically, via the third line 7, instructs the handler 2 to return to the normal frequency of the clock pulses, or automatically, and in a known manner, on detecting any interrupt, that is to say for example a tariff signal, the insertion of a coin into the automatic mechanism, the action of pressing a key of the keypad, the action of lifting or replacing the handset, by virtue of any instruction not represented in FIG. 1. The handler 2 receives the addresses A0 to A15 from the address bus 15 (FIG. 3) of the microprocessor 4, thus enabling it to detect the interrupts automatically, by virtue of the comparator 12, and to switch over to the normal frequency once having recognized these interrupts, without the aid of the third line 7. There is thereby a reaction by the microprocessor 4 to the interrupts at the normal frequency, which means that performance is not diminished. During the interval corresponding to the remainder of the 20 ms in the case where the frequency of the fixed timebase is 50 Hz, the microprocessor works at the reduced secondary frequency.

Figure 1A:
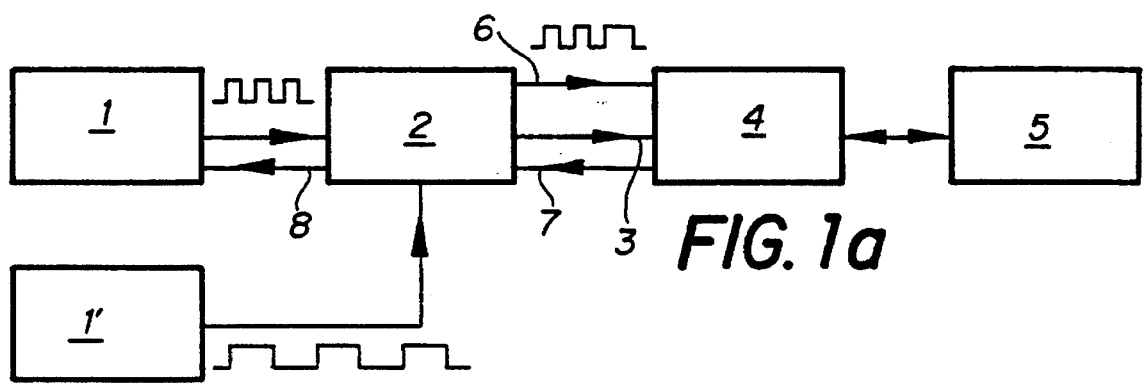
FIG. 1a represents the same block diagram in the case of a system of oscillators comprising two oscillators.

FIG. 1a represents a block diagram for the embodiment of the invention calling upon a system of oscillators comprising two oscillators:

a main oscillator 1 delivering a high, so-called normal, frequency;

a secondary oscillator 1' delivering a low, so-called secondary, frequency.

When the conditions prevailing in the station permit the microprocessor 4 to be placed in the inactive state, the microprocessor issues the command for placing into the inactive state to the handler 2 via the third line 7. The former sends a trigger command to the main oscillator 1 via the line 8, which appears only in this embodiment of the invention represented by FIG. 1a. The main oscillator is then cut off and the only pulses reaching the handler are the pulses of secondary frequency transmitted to the microprocessor via the second line 6, as well as the pulses of the fixed timebase transmitted to the microprocessor 4 via the first line 3.

Figure 2:
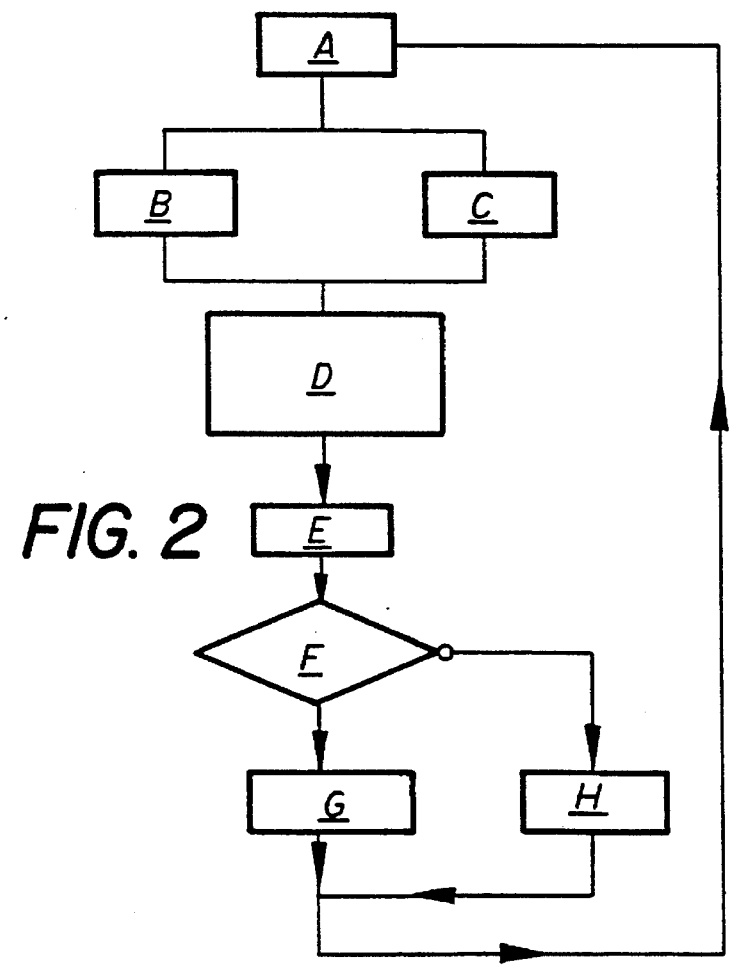
FIG. 2 represents a flowchart of the procedure for the action of the clock handler 2.

FIG. 2 represents a flowchart detailing the procedure by which the handler 2 passes to the normal frequency following an interrupt, then subsequently attempts to pass back to the secondary frequency generating electrical energy savings.

This flowchart which should be read from top to bottom comprises the following steps:

Step A denotes a standby state of the microprocessor 4, whether the frequency be normal or secondary.

Step B denotes the appearance of an external interrupt of random type.

Step C, which is an alternative to Step B having the same result, namely passing to normal frequency, denotes a software action internal to the handler 2, that is to say an internal interrupt prompted either by the fixed timebase of the handler, or by the microprocessor looping through sub-cycles commonly known as timers.

In both these cases, passing to the normal frequency is done automatically by the handler 2, by recognizing either an external or an internal interrupt.

Step D denotes the passing to or holding at normal frequency.

Step E denotes a state in which the microprocessor 4 carries out at least one cycle of checks. This cycle can only be carried out under proper conditions if the frequency is normal. It may include starting off timers of the microprocessor 4, which must necessarily be executed at the normal frequency at their respective due times so that the rest of the operations are carried out correctly.

Step F represents, after a work cycle of the microprocessor 4, an internal routine of the microprocessor 4 which tests for the arrival or not of the various timers at timeout.

Step G represents the path followed by the procedure in the event of a positive result in the preceding test: all the timers having arrived at timeout, the microprocessor 4 can pass to the inactive state and the clock frequency to the secondary frequency. This passing to the secondary frequency is done by sending an instruction to the application-specific integrated circuit, commonly known as ASIC, of which, for the purpose of reducing the number of integrated circuits, the handler 2 forms an integral part.

Step H represents the path followed by the procedure in the event of a negative result in the test of step F: at least one of the timers has not arrived at timeout, the microprocessor 4 cannot be passed to the inactive state, hence the normal frequency must be maintained.

When steps G or H have been carried out, the procedure resumes at Step A.

FIG. 3 represents a block diagram of the clock handler 2 incorporating a frequency divider in the case of a single oscillator. This handler 2 forms part of the application-specific integrated circuit termed ASIC. The oscillator 1 is linked to the handler 2 via the point CKIN, and delivers a fixed frequency of 4 MHz in the present example. The microprocessor 4 is linked to the handler 2 via the second line 6 which ends at the point CKOUT. Between these two points, the handler includes, in this embodiment of the invention, a divider 11 of the frequency by a power N of 2, N possibly varying. The maximum value of N is determined by the minimum frequency at which the microprocessor 4 can operate normally. Selection between the two frequencies is done either by the third line 7 (carrying the instruction hereafter referred to as SPEED) or by recognizing an interrupt by virtue of a comparator 12 connected to the addresses A0 to A15 of the address bus 15. The label 13 represents an OR function consisting, on the one hand, of a D type flip-flop which memorizes the state of the comparator 12 (arrival of an interrupt) in synchronism with the executing of the internal commands of the microprocessor 4, and, on the other hand, the instruction specific to the microprocessor 4 (line 7), these two conditions determining the position of the switch 14, and thereby the frequency carried by the line 6.

The OR function operates in the manner detailed in the following paragraph, in which 1 denotes the positive state and 0 the negative state:

if the address bus 15 is at 1 and SPEED likewise at 1, the result is also at 1;

if the address bus 15 is at 1 and SPEED is at 0, the result is at 1;

if the address bus 15 is at 0 and SPEED is at 1, the result is at 1;

if the address bus 15 is at 0 and SPEED is at 0, the result is at 0.

The recognition of an interrupt by the comparator 12 makes it possible to pass to the normal frequency irrespective of the state of the SPEED instruction arriving via the third line 7. The result of this recognition arrives at the switch 14 and directly determines the frequency of the second line 6 going to the microprocessor 4.

In the example chosen, relating to an embodiment calling upon a frequency divider, the frequency of the fixed timebase is 20 milliseconds. This fixed timebase also forms part of the so-called ASIC application-specific integrated circuit represented in FIG. 3. It comprises in particular two cascaded dividers, one dividing by 4,000, and the other by an integer P varying from 1 to 128. In the example represented, a normal oscillator frequency equal to 4 MHz and N equal to 20 have been chosen. A fixed timebase signal will then be obtained every 20 ms, namely a frequency equal to 50 Hz.

This value has the advantage of enabling the clock pulses to be used to generate the signals sent from the digital keypad of the station, when the latter calls a telephone number compiled on the keypad by the user. The keypad signals occur at a frequency which may vary, in most countries, between a high value "HIGH", corresponding to a period of 40 ms, and a low value "LOW", corresponding to a period of 60 ms. However, in France the use of a 16.6 ms timebase is required in order to compile a call number. This is why a divider by P is present. The value of P is adjusted before delivery of the station. Moreover, 20 ms is the maximum permitted so as to prevent the system for detecting coins inserted into the payment slot of the station from losing coins entered one immediately after the other.

The choice of the 250 kHz frequency is related to the characteristics of the microprocessor 4 used. This is the minimum frequency allowing risk-free operation.

The telephone line delivers about 150 mW. The lower the frequencies used, or conversely the higher the periods, the more energy-saving is the intelligent part of the station and the more storable energy remains with a view, for example, to actuating the magnets of the coin selector.

Figure 4:
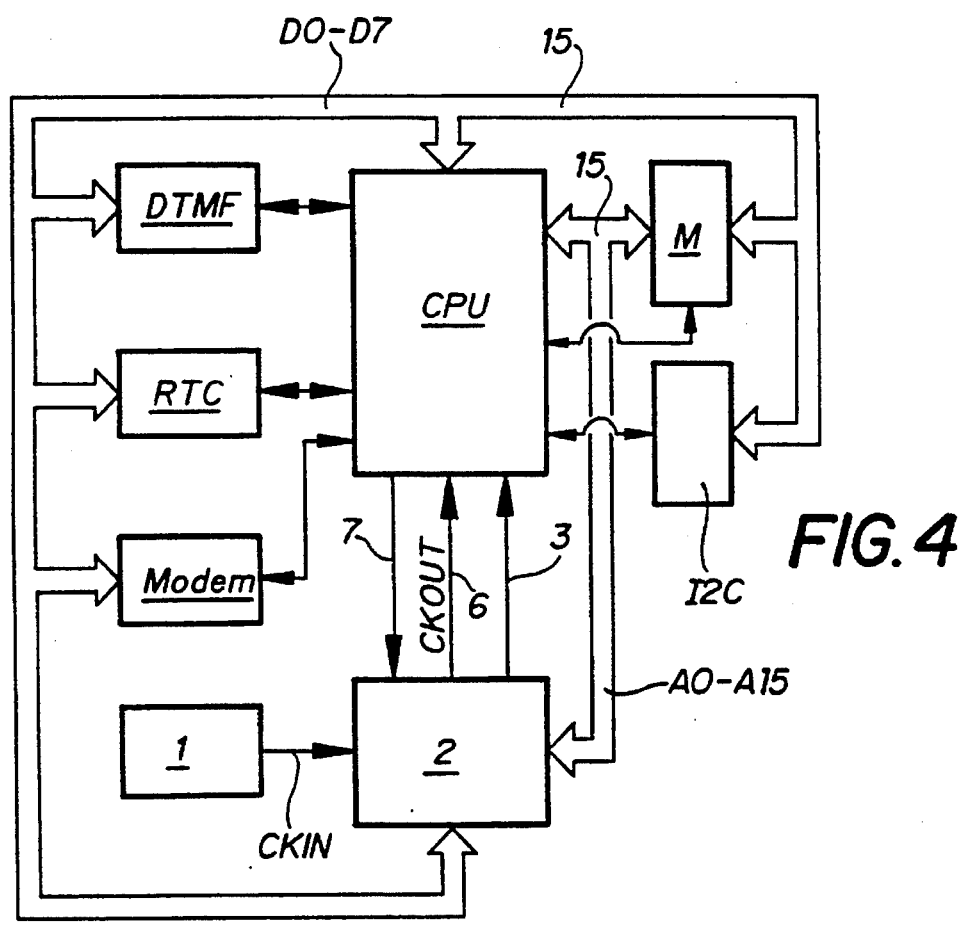
FIG. 4 represents diagrammatically the installation of the logic circuits 5 of FIG. 1, as well as of the central processing unit of the microprocessor 4 and the busses physically linking these elements.

FIG. 4 shows diagrammatically, on the station's logic board, the installation of the logic circuits 5 of FIG. 1, with the connecting of the various components by means of the address bus 15, represented by wide arrows, in the present illustrative embodiment. It goes without saying that the slender arrows can also comprise several conductors, or more generally several means for transmitting signals, for example by multiplexing.

The address bus 15 links the modem, meaning modulator-demodulator, the RTC, meaning Real Time Clock, the DTMF, meaning Dual Tone Multi Frequency, transmitter-receiver, the CPU, meaning Central Processing Unit, the memory M and the interface I2C. The address bus 15, or flow path, comprises high-order addresses A8 to A15 and low-order addresses A0 to A7 issued by a demultiplexer (not represented). To each type of interrupt there corresponds an address, this in particular enabling the handler 2, when an address corresponding to an interrupt appears on the address bus 15, to pass to the normal frequency.

For a microprocessor 4 consuming on average 3 mA with clock pulses of 4 MHz, this current strength will be observed to drop to values between 0.5 and 1 mA with a frequency reduced to 250 kHz.

Over the 20 ms separating two fixed timebase signals, 5 ms will see a consumption of 3 mA whereas the other 15 ms will see a consumption of 0.5 mA. This gives an average consumption of 1.12 mA and hence a ratio of 0.37. This represents a saving of 63%; as an average value, this saving may vary from 40 to 65%.

A further reduction in the frequency to 10 kHz or even less causes a corresponding reduction in the electrical energy consumed by the microprocessor 4.

We claim:

1. Process for reducing the average electrical energy consumption of a public telephone station subject to real-time constraints and equipped with a power reduction device comprising:

a microprocessor, which microprocessor passes temporarily into an energy-saving inactive state;

a system of oscillators providing clock pulses to the microprocessor, means for varying the clock frequency arriving at the microprocessor between a high frequency and a lower frequency, these means including:

a fixed timebase providing the microprocessor with fixed timebase signals via a first line, a second line for transmitting the clock pulses to the microprocessor, means for interpreting a command from the microprocessor to a handler for making the system pass from the active state to the inactive state and vice versa, comprising the steps of:

recognizing a need of the microprocessor to work at said high frequency;

commuting to the high frequency; and applying the frequency to the microprocessor 2. Process according to claim 1, wherein the means for interpreting comprises a third line setting the clock to the lower frequency, and a decoder decoding an address, recognizing the need of the microprocessor to work at said high frequency, and setting the clock frequency to the high frequency.

3. Process according to claim 2, wherein the decoder causes the frequency to be commuted to the normal frequency when an interrupt from the microprocessor is detected.

4. Process according to claim 1, wherein the oscillator system consists of a single oscillator and the handler comprises a frequency divider.

5. Process according to claim 1, wherein the system of oscillators comprises two oscillators, one termed the main oscillator delivering the high frequency termed the normal frequency, the other termed the secondary oscillator delivering the lower frequency termed the secondary frequency, and the handler comprises means for triggering the main oscillator when the secondary frequency is sufficient for the monitoring state, and for re-engaging it when the normal frequency is necessary for the microprocessor to work.

6. Process according to claim 4 or 5, wherein the normal frequency is 4 MHz, the secondary frequency is 250 kHz and the frequency of the fixed timebase is 50 Hz.

7. Device for reducing the average electrical energy consumption of a public telephone station subject to real-time constraints comprising:

a microprocessor, which microprocessor passes temporarily into an energy-saving inactive state;

a system of oscillators providing clock pulses to the microprocessor, means for varying the clock frequency arriving at the microprocessor between a high frequency and a lower frequency, these means including:

a fixed timebase providing the microprocessor with fixed timebase signals via a first line, a second line for transmitting the clock pulses to the microprocessor, means for interpreting a command from the microprocessor to a handler for making the system pass from the active state to the inactive state and vice versa, wherein the handler commutes to the high frequency after recognizing a need of the microprocessor to work at said high frequency, the frequency being applied to the microprocessor corresponding to its activity state.

8. Device according to claim 7, wherein the means comprises a third line setting the clock to the lower frequency, and a decoder decoding an address, recognizing the need of the microprocessor to work at said high frequency, and setting the clock frequency to the high frequency.

9. Device according to claim 8, wherein the oscillator system consists of a single oscillator and in that the handler comprises a frequency divider.

10. Device according to claim 9, wherein the system of oscillators comprises two oscillators, one termed the main oscillator delivering the higher frequency termed the normal frequency, the other termed the secondary oscillator delivering the lower frequency termed the secondary frequency, and the handler comprises means for triggering the main oscillator when the secondary frequency is sufficient for the monitoring state, and for re-engaging it when the normal frequency is necessary for the microprocessor to work.

11. Device according to claim 7, wherein the oscillator system consists of a single oscillator and the handler comprises a frequency divider.

12. Device according to claim 11, wherein the normal frequency is 4 MHz, the secondary frequency is 250 kHz and the frequency of the fixed timebase is 50 Hz.

* * * * *